(12) United States Patent
Schwarz, Jr.

(10) Patent No.: US 6,476,927 B1
(45) Date of Patent: Nov. 5, 2002

(54) JOB TOKEN PRINTER ASSIGNMENT SYSTEM

(75) Inventor: James K. Schwarz, Jr., Boulder, CO (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/010,369

(22) Filed: Jan. 21, 1998

(51) Int. Cl.$^7$ .............................................. G06F 15/00
(52) U.S. Cl. ..................................... 358/1.15; 358/1.13
(58) Field of Search ................................ 395/114, 112, 395/101, 110, 109, 102, 113, 500.44, 500.45, 500.48, 500.49; 358/468, 407, 467, 1.15, 1.13, 1.1, 1.11, 1.9, 1.2, 1.14; 709/201, 203, 219, 245; 710/3, 4, 9, 8, 15, 17–19, 62, 64, 72

(56) References Cited

U.S. PATENT DOCUMENTS

| | | | | |
|---|---|---|---|---|
| 5,220,674 A | * | 6/1993 | Morgan et al. ............. | 395/110 |
| 5,287,194 A | | 2/1994 | Lobiondo ................... | 358/296 |
| 5,402,527 A | | 3/1995 | Bigby et al. ................ | 395/101 |
| 5,450,571 A | * | 9/1995 | Rosekrans et al. .......... | 395/112 |
| 5,467,434 A | * | 11/1995 | Hower, Jr. et al. ......... | 395/114 |
| 5,475,801 A | | 12/1995 | Brindle et al. .............. | 395/114 |
| 5,483,653 A | | 1/1996 | Furman ...................... | 395/650 |
| 5,526,469 A | | 6/1996 | Brindle et al. .............. | 395/109 |
| 5,537,626 A | | 7/1996 | Kraslavsky et al. ........ | 395/828 |
| 5,611,046 A | | 3/1997 | Russell et al. ............ | 395/200.1 |
| 5,625,757 A | | 4/1997 | Kageyama et al. ......... | 395/113 |
| 5,630,079 A | | 5/1997 | McLaughlin ................ | 395/335 |
| 5,647,056 A | | 7/1997 | Barrett et al. ............. | 395/200.1 |
| 5,657,446 A | | 8/1997 | Pinard et al. ............. | 395/90.01 |
| 5,657,448 A | | 8/1997 | Wadsworth et al. ..... | 395/200.5 |
| 5,657,461 A | | 8/1997 | Harkins et al. ............. | 395/333 |
| 5,898,823 A | * | 4/1999 | Sorkin et al. .............. | 358/1.15 |

FOREIGN PATENT DOCUMENTS

| | | | | |
|---|---|---|---|---|
| EP | 0 646 857 A1 | 9/1994 | ........... | G06F/3/033 |
| EP | 0 653 700 A1 | 10/1994 | ........... | G06F/3/12 |
| EP | 0 738 957 A2 | 10/1995 | ........... | G06F/3/12 |
| EP | 749064 A1 | 12/1996 | ........... | G06F/3/12 |
| EP | 0 777 176 A1 | 6/1997 | ........... | G06F/3/12 |

* cited by examiner

Primary Examiner—Dov Popovici (57) ABSTRACT

A client provides a job ticket token to a print server, which contains the profile of a print job to be printed. The print server parses the job ticket token, determines an appropriate printer for the print job, and returns a selected printer token to the client, that includes the network address and name of the selected printer. The client then sends the print job, accompanied by the selected printer token, to the appropriate printer. In this way, the print job is assigned to a proper printer for the print job by the print server. One advantage of the job token printer assignment system is that the print server does not see the print job, but merely the job ticket token of the print job. Accordingly, the print server does not have to spool a large print job, but merely has to identify the characteristics contained in the job ticket token, and assign the print job to an appropriate printer. Further, because the print job is not transferred to the print server, but merely from the client to the printer, the network does not have to carry the print job twice.

20 Claims, 6 Drawing Sheets

JOB TOKEN PRINTER ASSIGNMENT SYSTEM

FIELD OF THE INVENTION

The invention relates to the field of print job distribution systems. More particularly, the invention relates to a job token printer assignment system to control the information flow and scheduling of printed documents.

BACKGROUND OF THE INVENTION

In a conventional print job distribution system, print job files are typically transferred across a system network twice. In such conventional systems, a central server first receives an entire print job over a network from a client computer. The central server then parses the print job, determines an appropriate printer for the print job, and then sends the entire print job to the selected printer over the network. While this type of print job distribution system offers centralized control and distribution of printed documents, the system requires that the print job, which may be quite large, is carried twice across the system network; once from the client computer to the print server, and again from the print server to the appropriate printer.

K. Kulbida, S. Haehn and K. Bunker, Document Server for Processing a Distribution Job in a Document Processing System, European Patent Application No. EP 0 77 176 A1 (Filed Nov. 28, 1996) disclose a document processing system that includes a document manager that coordinates the storing and processing of an image data set, and a distribution agent that communicates with the document manager. The document manager routes image data sets and job tickets, which include attributes for controlling the storing or processing of the image data sets at virtual devices.

D. Pinard, H. Sit and A. Niro, Local Area Communications Server, U.S. Pat. No. 5,657,446 (Aug. 12, 1997) disclose computer system connected to a local area network (LAN), a local area communications system (LAX) connected to the LAN, peripheral communications devices connected to the LAX, and an apparatus for controlling communications between the devices via the LAX.

A. Kraslavsky, W. Russell, G. Kalwitz, R. Wadsworth and L. Barrett, Apparatus for Coupling Printer with LAN to Control Printer Operation by Transferring Control Parameters, Printer Status Data and Printer Configuration Data Between Printer and LAN, U.S. Pat. No. 5,537,626 (Jul. 16, 1996) disclose a circuit board coupled to a printer for interfacing the printer to a LAN. The board includes a Small Computer Systems Interface (SCSI) for transmitting data to the printer and for receiving print status data form the printer.

W. Russell, A. Kraslavsky, R. Wadsworth, L. Barrett, G. Kalwitz, T. Ip and W. Kuver, Method and Apparatus for Interfacing a Peripheral to a Local Area Network, U.S. Pat. No. 5,611,046 (Mar. 11, 1997) disclose a circuit board coupled to a printer for interfacing the printer to a LAN. A bidirectional printer interface on the board transmits print data to the printer and receives printer status data from the printer. A processor on the board executes both application programs and status and control programs.

S. Kageyama, S. Matsumoto, M. Kitagawa, T. Shimakawa, J. Kazama and T. Okada, Printing System, U.S. Pat. No. 5,625,757 (Apr. 29, 1997) disclose a printing system having a plurality of terminal equipment, a plurality of printers that can be shared by the terminal equipment, and one or more printer/spooler control servers for receiving a print from the terminal equipment, and for controlling the print job by a printer. The system also includes a distributed printing management server, for various errors that occur in the printers. While Kageyama et al. disclose a networked printing system, print jobs are transferred through the print server.

L. Barrett, W. Russell, A. Kraslavsky, R. Wadsworth and G. Kalwitz, Method and Apparatus for Managing Access to a Networked Peripheral, U.S. Pat. No. 5,647,056 (Jul. 8, 1997) disclose a method and apparatus for interfacing a peripheral to a LAN with an interactive network board connected to the peripheral device. An access management program establishes direct communication between a network client and the network board. The board may also execute a peripheral server program such as a print server.

R. Wadsworth, W. Russell, G. Kalwitz, L. Barrett and A. Kraslavsky, System for an Interactive Network Board Remotely Configurable by Selecting from a Plurality of Functionality Defining Software, Such as a Printer Server Stored in PROM, U.S. Pat. No. 5,657,448 (Aug. 12, 1997) disclose a method and apparatus for forming an operational configuration of an interactive network card coupled to a LAN printer.

L. Furman, Printing System with File Specification Parsing Capability, U.S. Pat. No. 5,483,653 (Jan. 9, 1996) discloses a printing system for producing prints based on a print file specification, which includes a work station and a print server for storing the print file. An operating system permits communication between the work station and the print server. A disclosed parsing arrangement converts the format of the print file when a call to output the print file is sent from the work station to the print server. While Furman discloses a system for producing prints based on a print file specification, the print file is transferred to and stored within the print server.

E. Brindle, J. Czudak and D. Mensing, System for Printing Image Data in a Versatile Print Server, U.S. Pat. No. 5,526,469 (Jun. 11, 1996) disclose a system for connecting a source of image data to an output device for printing the image data. A portion of the image data is polled for the presence of the data image format. The format structure operates the output device to print the image data. While Brindle et al. disclose a system for printing image data, the system transfers the image data twice, once from image data sources to the print server, and again from the print server to the printer.

D. McLaughlin, Document Job Key to Tailor Multifunctional User Interfaces, U.S. Pat. No. 5,630,079 (May 13, 1997) discloses a document key for determining selections needed to support a combination of services. The user can specify document source and document destination characteristics.

B. Bigby, M. O'Brien and E. Brindle, Apparatus and Method for Determining the Page Description Language in Which a Print Job is Written, U.S. Pat. No. 5,402,527 (Mar. 28, 1995) disclose a printing system from a print job written in one of a plurality of page description languages, wherein analyzing units sample the print job and output information regarding the print job, such as the page description language in which the print job is written.

E. Brindle, J. Czudak, C. Willette, J. Bernard, C. Nail, M. Campanella, S. Fedele, and G. Tellex, System for Controlling the Printing of Electronic Documents with Various Page Description Languages and Other Parameters, U.S. Pat. No. 5,475,801 (Dec. 12, 1995) disclose a network comprising a plurality of computers having various page description languages (PDL's) are interfaced to a central printer, wherein a user can control the printing of electronic documents.

L. Harkins, K. Hayward, T. Herceg, J. Levine and D. Parsons, User Interface for Defining and Automatically Transmitting Data According to Preferred Communication Channels, U.S. Pat. No. 5,657,461 (Aug. 12, 1997) disclose a user interface for the distribution of information to a receiver on a network, using devices such as printers, and communications channels defined in a receiver profile. Receivers control network senders, by controlling sender channel access to a receiver by defining channel access priority, and by selectively allowing senders to override the receiver profile.

L. Harkins, J. Levine, K. Hayward, D. Parsons and T. Herceg, User Interface for Defining and Automatically Transmitting Data According to Preferred Communication Channels, European Patent Application No. 0 646 857 A1 (Filed Sep. 30, 1994) disclose a user interface for the distribution of information to a receiver on a network, using devices such as printers, and communications channels defined in a receiver profile. Receivers control network senders, by controlling sender channel access to a receiver by defining channel access priority, and by selectively allowing senders to override the receiver profile.

A. Suzuki, K. Yamada, K. Nishiyama, T. Nakatani, and Y. Nakamura, Job Scheduling System for Print Processing, European Patent Application No. EP 0 738 957 A1 (Filed Oct. 20, 1995) disclose a print job scheduling system, in which a plurality of documents are assigned attributes by user equipment, and are sent to a job scheduling device. The job scheduling device pauses documents, performs other job scheduling and processing functions, and executes the transfer and printing of the plurality of documents. While Suzuki et al. disclose a job scheduling system for print processing, the system transfers the print jobs twice, once from user equipment to the job scheduling device, and again from the job scheduling device to a printer.

Y. Mori, F. Abe, K. Ishiguro, S. Ueyama, M. Ito, T. Sato, Y. Saitoh and Y. Kida, Network Printer Apparatus, European Patent Application No. 0 653 700 A1 (Filed Oct. 3, 1994) disclose a network printing apparatus, which processes and transfers printing information sequentially from a client, to a LAN interface driver, a communication protocol controller, a spooling controller, a storage unit, a print controller, and to a printer. While Mori et al. disclose a networked printer apparatus, the printing information is transferred to the spooling controller, stored at the intermediate storage unit, and is then sent again to the printer.

It would be advantageous to provide a method and apparatus to minimize the transfer of print files across a network. It would also be advantageous to provide a method to minimize the transfer of print files across a network, while providing centralized accounting information.

While the disclosed prior art systems and methodologies provide basic printing and printer control systems, they fail to provide a print server print job token that minimizes network loads, while providing central printer control and accounting information. The development of such a print job distribution and scheduling system would constitute a major technological advance.

SUMMARY OF THE INVENTION

A client provides a job ticket token to a print server, which contains the profile of a print job to be printed. The print server parses the job ticket token, determines an appropriate printer for the print job, and returns a selected printer token to the client, that includes the network address and name of the selected printer. The client then sends the print job, accompanied by the selected printer token, to the appropriate printer. In this way, the print job is assigned to a proper printer for the print job by the print server. One advantage of the invention is that the print server does not see the print job, but merely the job ticket token of the print job. Accordingly, the print server does not have to spool a large print job, but merely has to identify the characteristics contained in the job ticket token, and assign the print job to an appropriate printer. Further, because the print job is not transferred to the print server, but merely from the client to the printer, the network does not have to carry the print job twice.

DETAILED DESCRIPTION OF PREFERRED EMBODIMENTS

Figure 1:
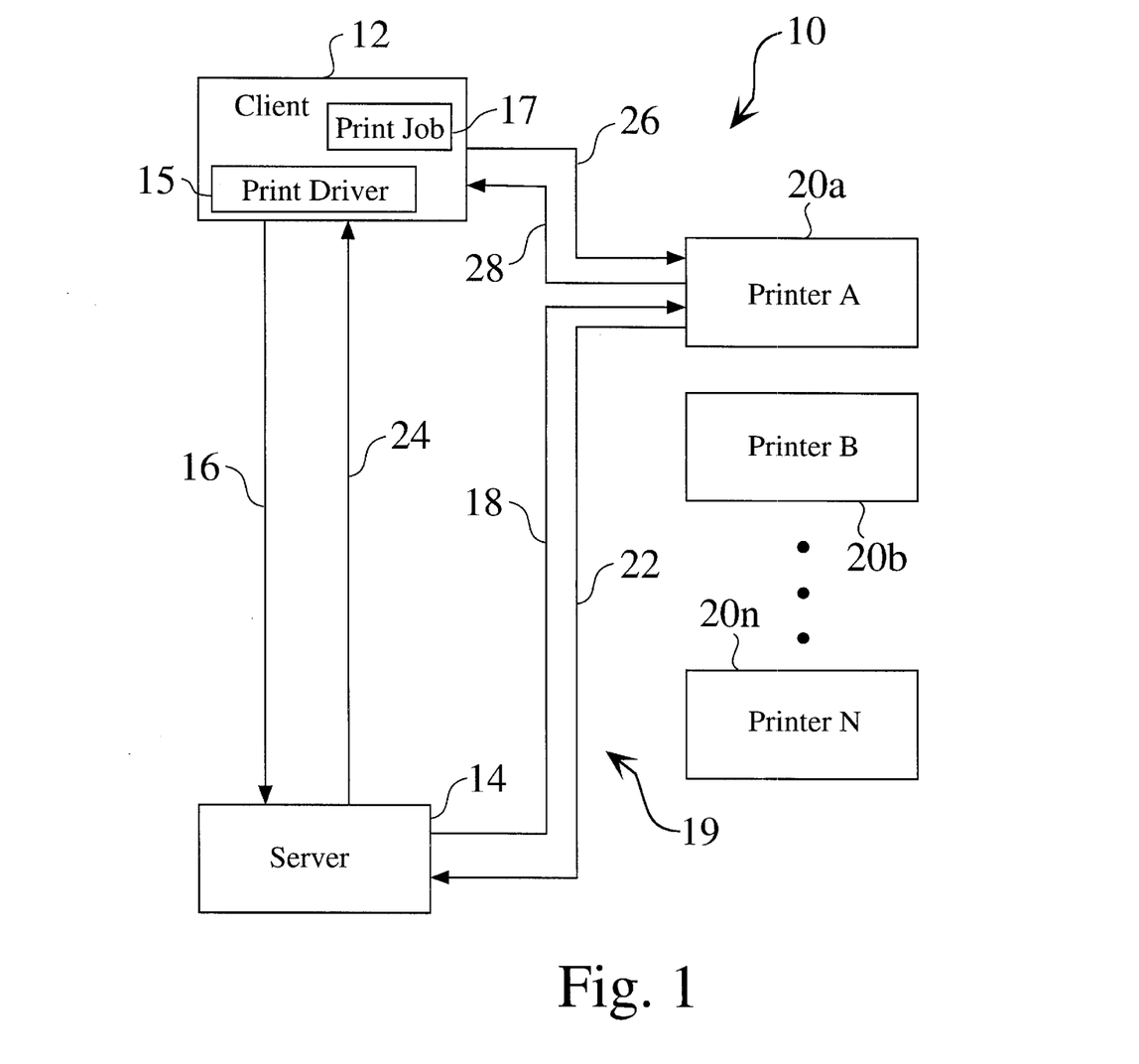
FIG. 1 is a block diagram of a job token printer assignment system between a client computer, a print server and a plurality of printers, according to the invention.

FIG. 1 is a block diagram of a job token printer assignment system 10, configured across a network 19, between a client computer 12, a central print server 14, and a plurality of printers 20a–20n.

A small job ticket token 40 (FIG. 3) is sent 16 from a print driver 15 within a client computer 12 to the print server 14. The job ticket token 40 includes the characteristic information regarding a print job 17, and a request to the print server 14 for the address of an appropriate printer 20 to send the print job 17.

The print server 14 parses the job ticket token 40, determines an appropriate printer for the print job 17, and returns 24 a selected printer token 50 (FIG. 4) to the client computer 12. The selected printer token 50 includes the network address and name of the selected printer 20.

Figure 4:
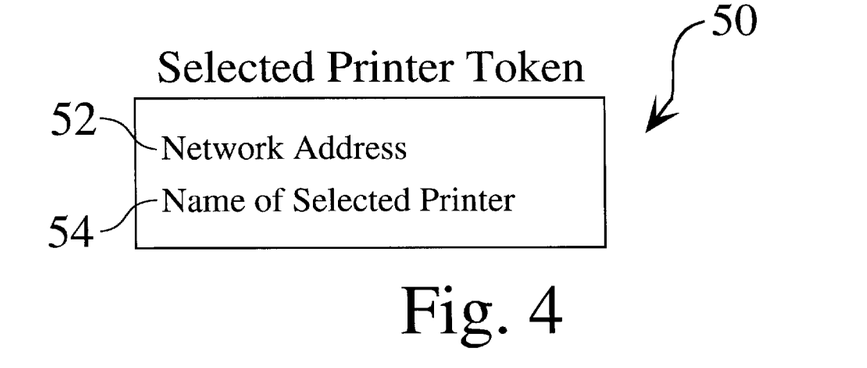
FIG. 4 is a block diagram of a selected printer to ken, according to the invention.

The print driver 15 within the client computer 12 then sends 26 the print job 17 to the selected printer 20, based upon the network address 52 and name 54 of the selected printer 20 that is included in the selected printer token 50.

The print driver 15 can optionally send a status request datagram 60 (FIG. 5) to a selected printer 20, in regard to a print job 17. The selected printer 20 can optionally send 28 a status information datagram 64 (FIG. 6) regarding the status of the print job 17 to the client computer 12.

Figure 2:
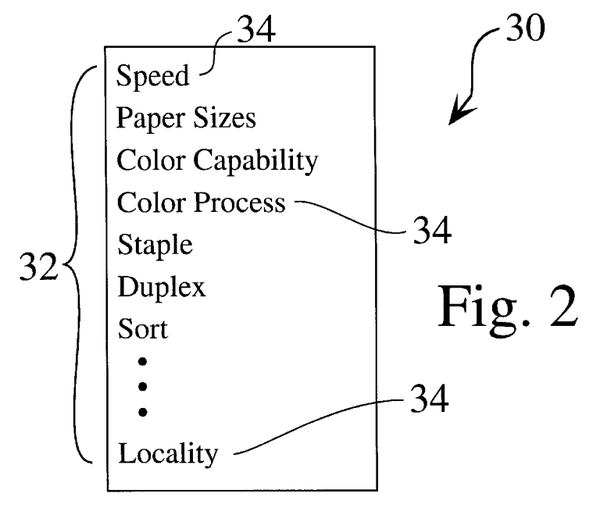
FIG. 2 is a block diagram of printer pool characteristics, according to the invention.

When a user invokes the printing process at a client computer 12, the print driver 15 is activated. The printer driver 15 allows the user to select a union print options 32 from a superset of all available options 34 from a printer pool 30, which is shown in FIG. 2. The printer pool 30 consists of printers 20 with a known set 32 of printer options and capabilities 34, such as desired print speed, print quality, available paper sizes, color, stapling and binding options, duplexing, sorting, and printer locality.

Figure 3:
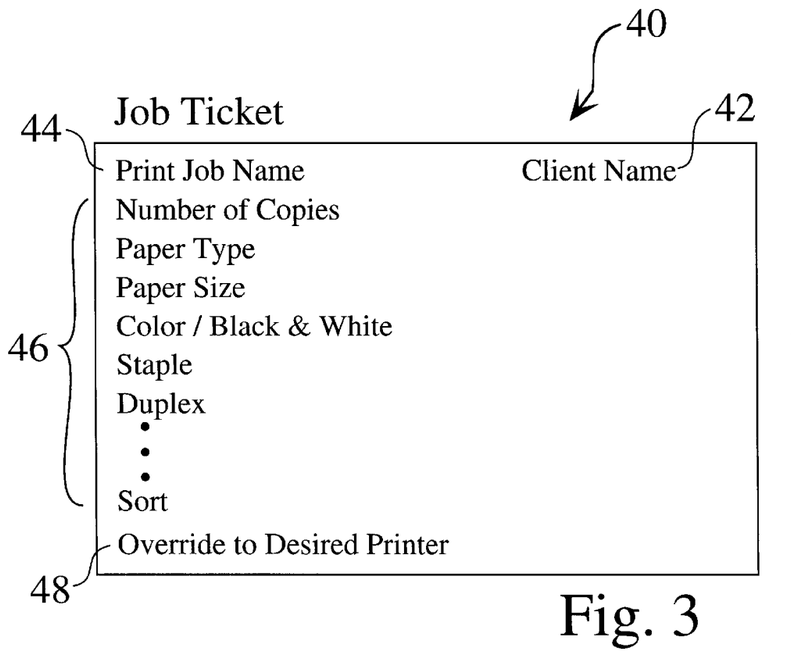
FIG. 3 is a block diagram of a job ticket token, according to the invention.

The print driver 15 then constructs a print job ticket 40 from the selected print options 34. FIG. 3 is a block diagram of a print job ticket 40, which contains the name 42 of the client 12, the print job name 44 and selected print options 46, such as the desired number of copies, paper type, paper size, color and/or black and white printing, stapling and binding options, duplexing, and sorting options.

Job tickets 40 may optionally contain a printer selection override option 48 to a printer 20, depending on the access and printing privileges designated for a given client 12. A printer selection override option 48 is used to provide priority control over the selection and use of printers 20. When a job ticket 40 contains a printer selection override option 48, the server 14 accepts the printer selection request, checks that the selected printer 20 is available and on-line, and returns the selected print token 50 to the client that includes the address of the selected printer.

Even when the printer selection override option 48 is selected, the job ticket 40 is typically sent to the print server 14, to confirm that the selected printer 20 is available, to allow the print server 14 to gather information about the print job 17, and to control the scheduling of multiple print jobs 17 to the printer 20. If the selected printer 20 is not available and on-line, the print server returns an error message to the print driver 15 at the client computer 12.

FIG. 4 is a schematic block diagram of a selected printer token 50. The selected printer token 50 contains the network address 52 and the name 54 of the selected printer 20.

Figure 5:
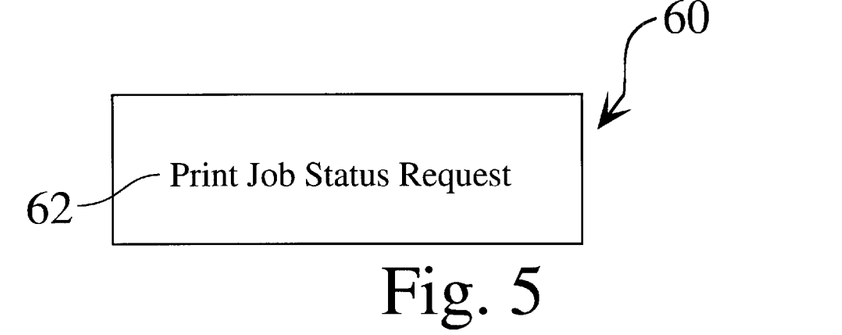
FIG. 5 is a block diagram of a status request datagram, according to the invention.

FIG. 5 shows a status request datagram 60, which can optionally be sent from a print driver 15 to a selected printer 20 in regard to a print job 17. The status request 60 queries the printer 20 for printer status information, such as whether the printer is busy, whether the printer is off-line, the number of copies left to print for a print job 17, and whether the printer 20 is out of a required paper type.

Figure 6:
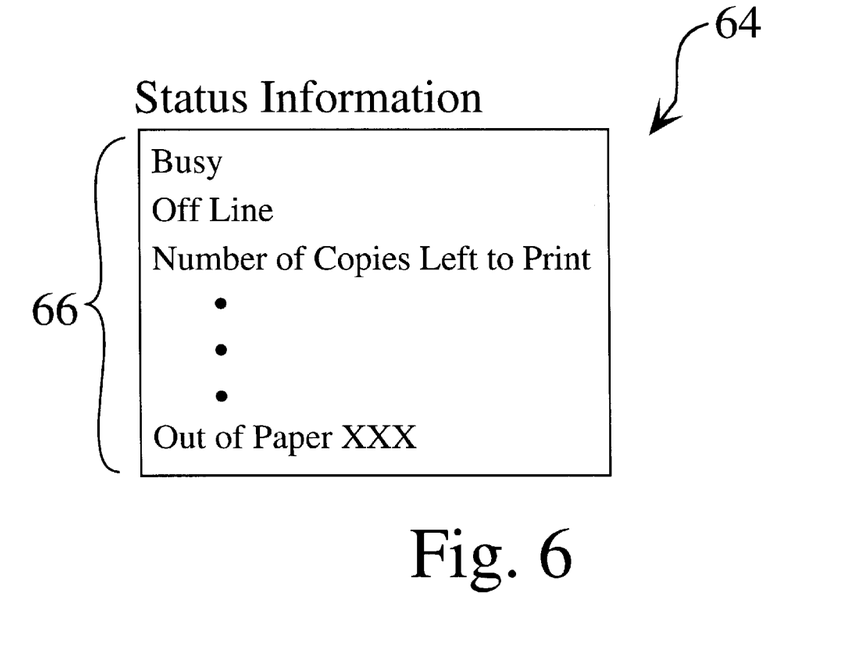
FIG. 6 is a block diagram of a status information datagram, according to the invention.

FIG. 6 is a schematic block diagram of a status information datagram 64, which can optionally be sent from a selected printer 20 to a print driver 15 at a client 12, in regard to a print job 17. The status information datagram 64 includes printer status information, such as whether the printer is busy, whether the printer is off-line, the number of copies left to print for a print job 17, and whether the printer 20 is out of a required paper type. The status information datagram 64 may either be sent by the printer 20 to a client 12 automatically, or may be sent in response to a status request datagram 60.

The job token printer assignment system 10 takes advantage of the use of datagrams to efficiently transfer information across the system network 19. The datagrams include print job ticket tokens 40, status requests 60, status information datagrams 64, and selected printer tokens 50.

Figure 7:
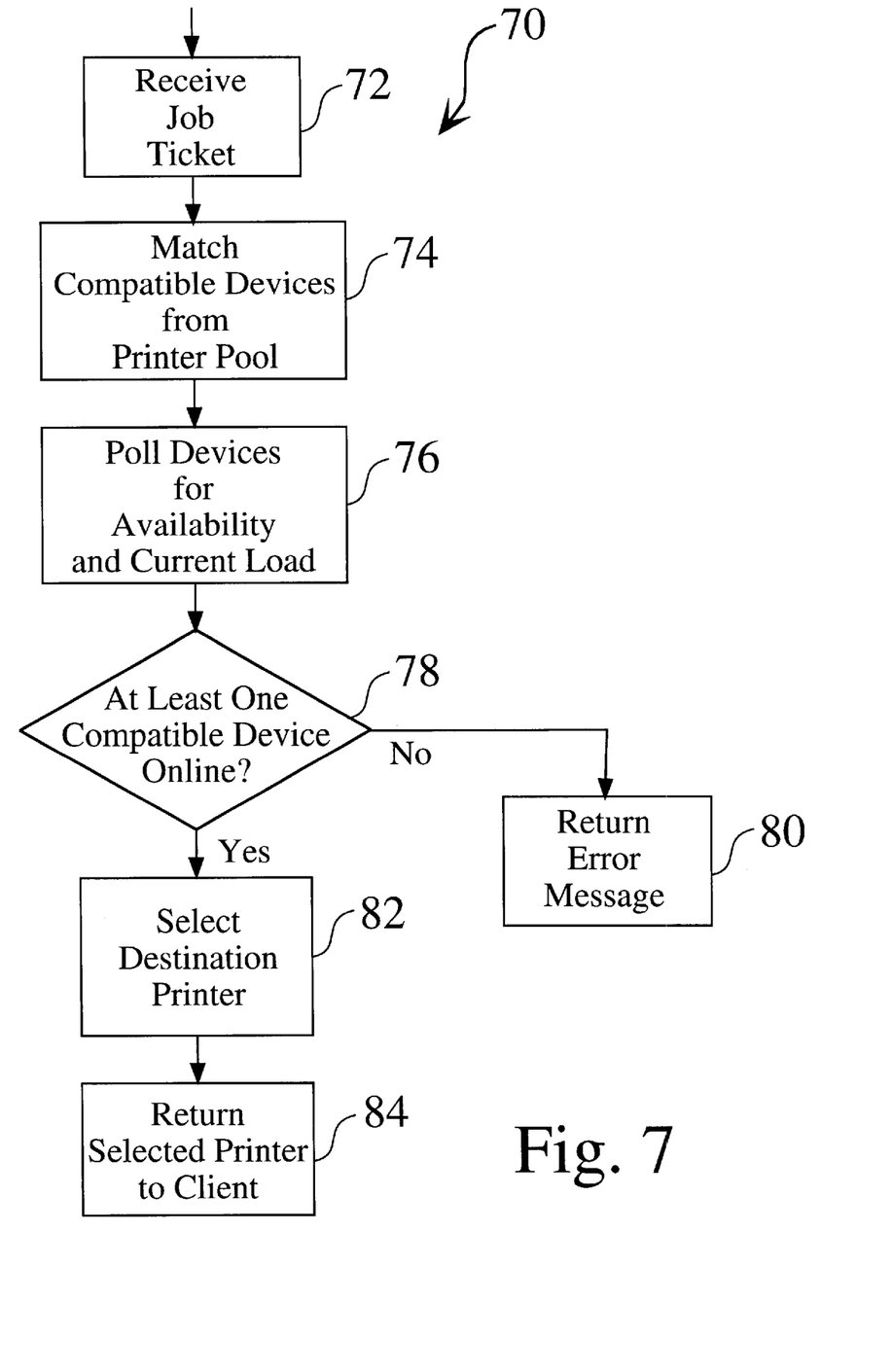
FIG. 7 is a flow diagram for the print token process within a print server, according to the invention.

FIG. 7 is a flowchart of a basic print token process 70 within a print server 14. The print server 14 first receives 72 a print job ticket 40 from a client 12. Based on the print job ticket 40, the print server 14 matches 74 compatible printer devices 20 from the printer pool 30 of all available printers 20. The print server 14 then polls 76 the available printer devices 20 for their availability and current work load. From this polling information, the print server decides 78 if there is at least one compatible device 20 online. If there is, the print server 14 selects 82 the desired destination printer 20, and returns 84 a selected printer token 50 to the client 12. If there is not at least one compatible device 20 online, the print server 14 returns an error message 80 to the client 12.

Figure 8:
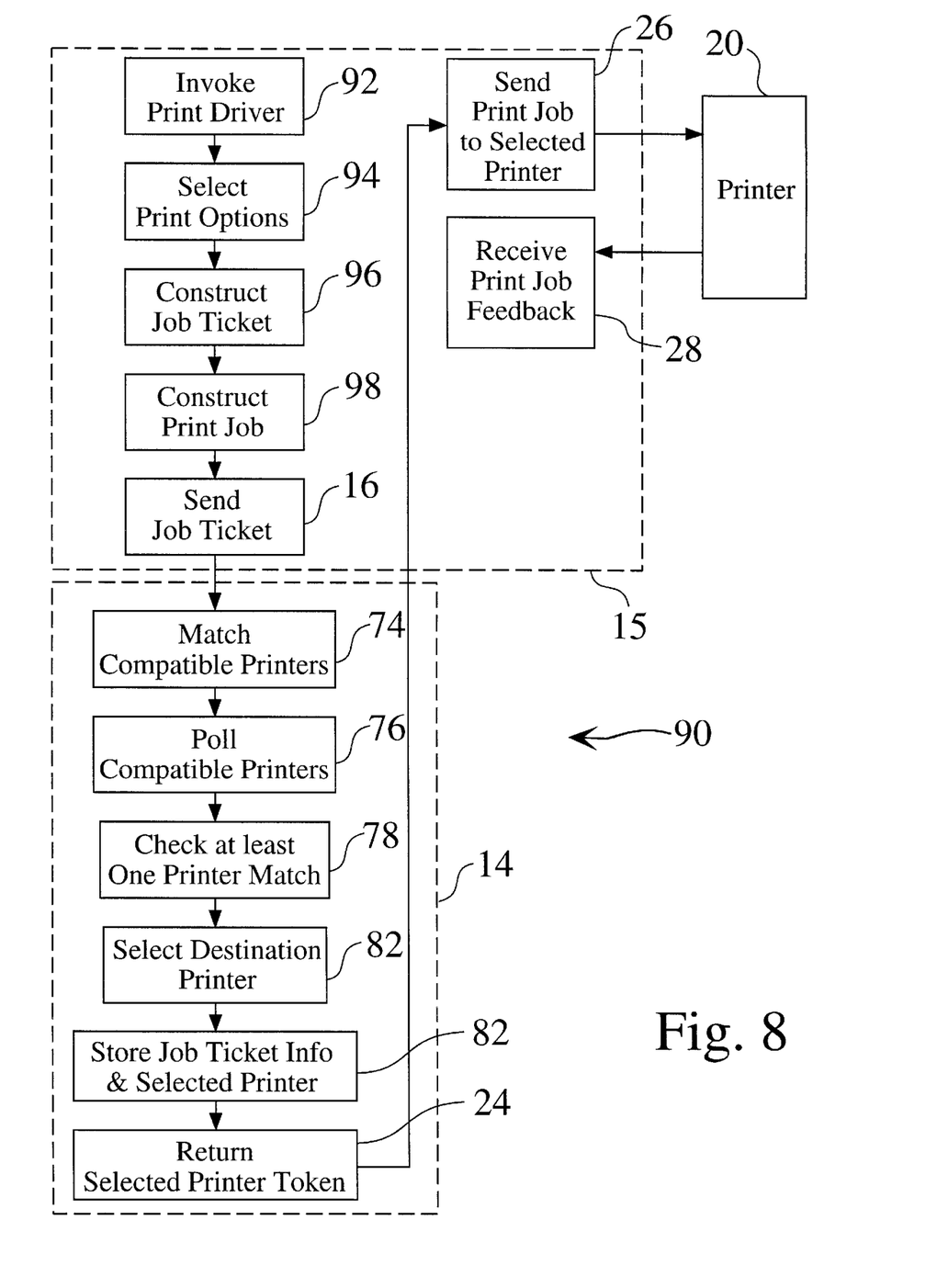
FIG. 8 is a workflow diagram for the job token printer assignment system, according to the invention.

A workflow diagram 90 for the job token printer assignment system 10 is shown in FIG. 8. At the client computer 12, a user invokes the print process by activating 92 the print driver 15. The user the selects 94 print options 34 from the superset 32 of all available options from the printer pool 30. A job ticket 40 is then constructed 96 from user options. The print job 17 is then constructed 98 from job ticket information 46 and print commands. The print driver 15 then sends 16 the job ticket 40 to the print server 14.

The print server 14 receives the job ticket 40, and matches 74 compatible devices from printers 20 in a printer pool list. The print server 14 then polls 76 compatible devices 20 for availability. The print server 14 then checks to confirm that at least one printer matches the requirements 78. The print server 14 then selects a destination printer 20 based on matching criteria (time to print, cost, location, manual override). The print server 14 stores 82 job ticket information along with the selected printer 20 in a job log for future accounting. The print server 14 then returns 24 a selected print token 50 to the client computer 12.

At the client computer 12, the print driver 15 receives the selected print token 50, and sends 26 the print job 17 to the selected printer 20. The print driver 15 optionally receives feedback from the selected printer 20 regarding the success or status of a print job 17.

Figure 9:
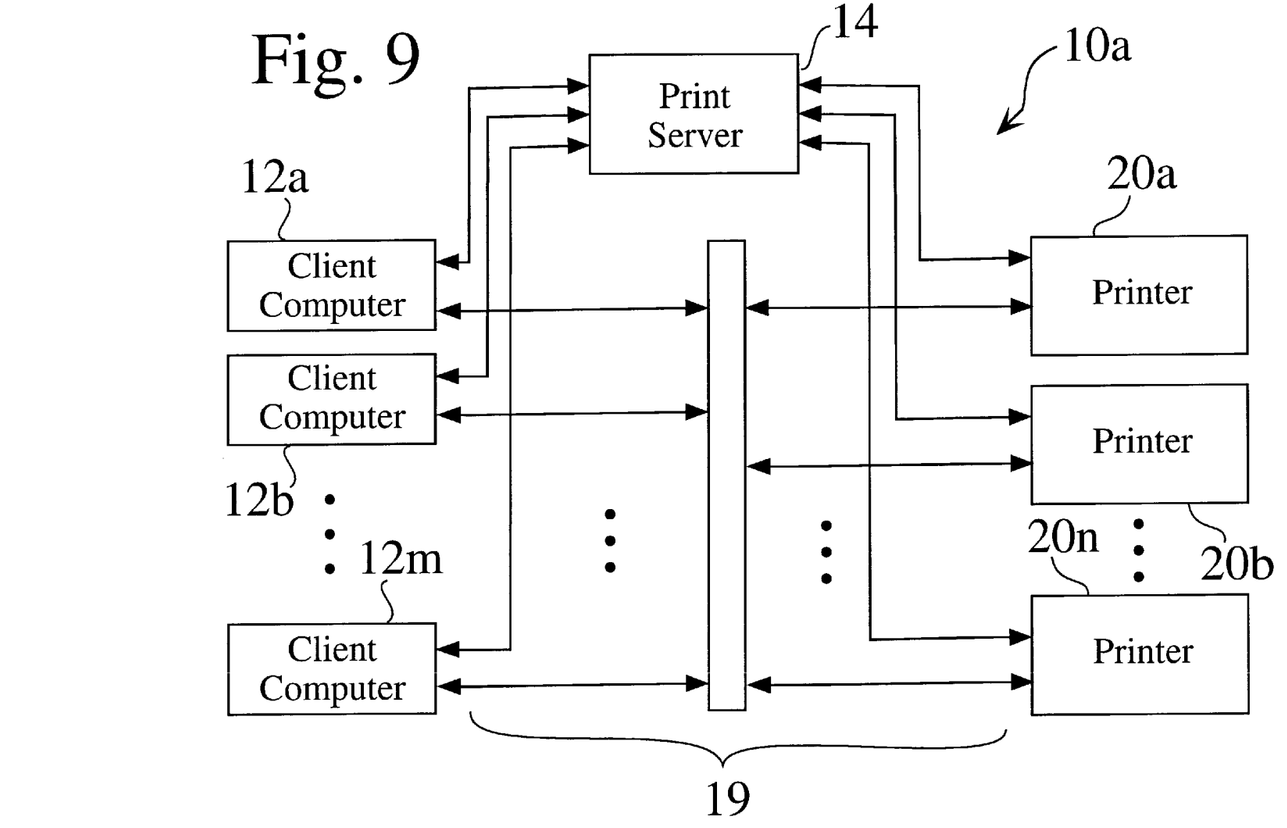
FIG. 9 is a block diagram of a job token printer assignment system configured between a plurality of source computers, a print server, and a plurality of printers, according to the invention.

FIG. 9 is a block diagram of an alternate job token printer assignment system 10a, configured across a network 19 between a plurality of source computers 12a–m, a client server 14, and a plurality of printers 20a–n.

System Advantages. The job token printer assignment system 10 minimizes network loads, since print job files 17, which can be quite large, are only sent over the network 19 once, between a client computer 12 and a selected printer 20.

In the job token printer assignment system 10, the central print server 14 has a low required overhead for each print job 17, since the print jobs 17 are not transferred through the print server 14. Therefore, the central print server 14 can be used for a large number of clients 12 and printers 20.

The job token printer assignment system 10 inherently provides central job accounting, since the relevant specifications of print jobs are "seen" and can be stored by the central print server 14, when the central print server 14 parses the incoming job ticket 50.

Although the job token printer assignment system and its methods of use are described herein in connection with client computers, networks, print servers, and printers, the system and techniques can be implemented with other computers, servers and image processing devices, such as print controllers, scanners and copiers, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

I claim:

1. A process for scheduling a print job, comprising the steps of:

sending a job ticket token from a client to a print server, said job ticket token containing a specification for said print job;

selecting an appropriate printer for said print job at said print server, based upon said contained specification for said print job within said sent job ticket token;

sending a selected printer token from said print server to said client, said selected printer token containing an address of said selected appropriate printer; and sending said print job from said client directly to said selected appropriate printer, based on said address of said selected appropriate printer.

2. The process of claim 1, wherein said specification for said print job includes at least one print job option.

3. The process of claim 1, wherein said specification for said print job includes a printer selection override option.

4. The process of claim 1, wherein said appropriate printer is selected from a plurality of printers.

5. The process of claim 4, wherein said step of selecting an appropriate printer for said print job further comprises the steps of:

matching compatible printers from said plurality of printers, based on said job ticket token;

polling said compatible printers for printer availability;

checking that at least one of said compatible printers is online; and selecting said appropriate printer for said print job from one of said compatible online printers.

6. The process of claim 1, further comprising the step of:

storing information relating to said print job on said print server.

7. The process of claim 1, further comprising the step of:

sending a status request datagram from said client to said appropriate printer regarding status of said print job.

8. The process of claim 1, further comprising the step of:

sending a status information datagram from said appropriate printer to said client regarding status of said print job.

9. A process for scheduling a print job, comprising the steps of:

creating a job ticket token on a client computer, said job ticket token containing a specification for said print job;

sending said job ticket token to a print server;

parsing said job ticket token at said print server to determine said specification of said print job;

determining an appropriate printer for said print job based upon said parsed job ticket token;

creating a selected printer token based on said determined appropriate printer;

sending said selected printer token to said client computer, said selected printer token containing an address of selected printer based on said job ticket token; and sending said print job from said client computer directly to said appropriate printer, based on said address of said selected printer.

10. The process of claim 9, wherein said specification for said print job includes at least one print job option.

11. The process of claim 9, wherein said specification for said print job includes a printer selection override option.

12. The process of claim 9, wherein said appropriate printer is determined from a plurality of printers.

13. The process of claim 12, wherein said step of determining an appropriate printer for said print job further comprises the steps of:

matching compatible printers from said plurality of printers, based on said parsed job ticket token;

polling said compatible printers for printer availability;

checking that at least one of said compatible printers is online; and determining said appropriate printer for said print job from one of said compatible online printers.

14. The process of claim 9, further comprising the step of:

storing information relating to said print job on said print server.

15. The process of claim 9, further comprising the step of:

sending a status request datagram from said client computer to said appropriate printer regarding status of said print job.

16. The process of claim 9, further comprising the step of:

sending a status information datagram from said appropriate printer to said client computer regarding status of said print job.

17. An apparatus for scheduling a print job, comprising:

a client computer adapted to construct a job ticket token containing a specification for said print job; and a print server adapted to receive said job ticket token from said client computer, select an appropriate printer for said print job, construct a selected printer token containing an address of said selected printer, and send said selected printer token to said client computer;

wherein said client computer is also adapted to receive said selected printer token from said print server, and send said print job directly to said selected printer.

18. The apparatus of claim 17, wherein said specification for said print job includes at least one print job option.

19. The apparatus of claim 17, wherein said specification for said print job includes a printer selection override option.

20. The apparatus of claim 17, wherein said appropriate printer is selected from a plurality of printers.

* * * * *